US012774971B2

(12) United States Patent
Kakosimos et al.

(10) Patent No.: US 12,774,971 B2
(45) Date of Patent: Oct. 27, 2026

(54) METHOD OF MONITORING THE ENCLOSURE COOLING

(71) Applicant: ABB Schweiz AG, Baden (CH)

(72) Inventors: Panagiotis Kakosimos, Västerås (SE); Olli Alkkiomäki, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 633 days.

(21) Appl. No.: 18/306,725

(22) Filed: Apr. 25, 2023

(65) Prior Publication Data

US 2023/0349848 A1 Nov. 2, 2023

(30) Foreign Application Priority Data

Apr. 29, 2022 (EP) .................................... 22386023

(51) Int. Cl.

*G01N 25/18* (2006.01)
*G01K 17/08* (2006.01)
*G06F 1/20* (2006.01)

(52) U.S. Cl.

CPC ............. *G01N 25/18* (2013.01); *G01K 17/08* (2013.01); *G06F 1/206* (2013.01)

(58) Field of Classification Search

CPC ........ G01N 25/18; G01K 17/08; G01K 17/20; G06F 1/206

See application file for complete search history.

(56) References Cited

U.S. PATENT DOCUMENTS

2015/0116507 A1* 4/2015 Sagerian .................. H04N 5/64 348/189
2016/0187272 A1* 6/2016 Ishii ......................... G01K 7/42 702/136
2017/0219230 A1* 8/2017 Agnaou ............... F24F 11/0001
2019/0319523 A1* 10/2019 Jin ......................... H02K 23/36

FOREIGN PATENT DOCUMENTS

CN 2476020 Y 2/2002
EP 3358323 A1 8/2018
FR 2907215 A1 4/2008
KR 20100006018 U * 6/2010 ......... H05K 7/20509
WO 2021012887 A1 1/2021
WO WO-2022023342 A1 * 2/2022 ............. G06F 30/30

OTHER PUBLICATIONS

Machine translation of KR20100006018U (Year: 2010).*
European Search Report; Application No. EP2236023; Completed: Oct. 21, 2022; 3 Pages.

* cited by examiner

*Primary Examiner* — Lee E Rodak
*Assistant Examiner* — Sangkyung Lee
(74) *Attorney, Agent, or Firm* — Greenberg Traurig, LLP

(57) ABSTRACT

A method and apparatus for monitoring a thermal load in an enclosure including at least one electric device, the apparatus being configured to receive temperature data on a temperature outside the enclosure, temperature data on a temperature inside the enclosure and data indicative of heat generated by the at least one electric device into the enclosure, to determine a thermal resistance of the enclosure (Continued)

and/or a thermal capacitance of the enclosure on the basis of the received data, and to determine a cooling status of the enclosure on the basis of the determined thermal resistance of the enclosure and thermal resistance reference data and/or on the basis of the determined thermal capacitance of the enclosure and thermal capacitance reference data.

19 Claims, 2 Drawing Sheets

METHOD OF MONITORING THE ENCLOSURE COOLING

TECHNICAL FIELD

The present invention relates to monitoring cooling of an enclosure, and more particularly to monitoring cooling of an enclosure comprising at least one electric device.

BACKGROUND

An enclosure, such as a housing or a room, may contain one or more heat sources, such as electric machines, drives and/or other electric devices. If the enclosure is large enough and adequately cooled, the heat produced by the one or more electric devices therein does not increase the enclosure temperature excessively. However, if the cooling of the enclosure is insufficient, the heat losses from the one or more electric devices therein may increase the enclosure temperature to a level that is detrimental for the equipment, for example.

Proper and sufficient enclosure cooling may often be neglected despite that it may lead to insufficient cooling of electric devices in the enclosure. As an example, the enclosure conditions may be inspected only after a fatal failure has occurred. High ambient temperature may lead to premature component aging, and also components and devices, such as capacitors, fans, and insulations, among others, may age faster in higher operating temperatures. Moreover, poor enclosure cooling can accelerate temperature cycling since the temperature cycle amplitude increases further when the enclosure air is heated. The temperature cycling can cause additional fatigue damage to e.g. powertrain components, and especially to those where materials of different thermal expansion coefficients are in contact, for instance.

A problem related to the above is that monitoring the enclosure cooling is an important but challenging task.

SUMMARY

An object of the present invention is thus to provide a method and an apparatus for implementing the method so as to overcome the above problem or at least to alleviate the above problem. The objects of the invention are achieved by a method and an apparatus which are characterized by what is stated in the independent claims. The preferred embodiments of the invention are disclosed in the dependent claims.

The invention is based on the idea of determining a thermal resistance of the enclosure and/or a thermal capacitance of the enclosure on the basis of temperature data and data indicative of heat generated by the at least one electric device into the enclosure, and determining a cooling status of the enclosure on the basis of the determined thermal resistance and/or thermal capacitance of the enclosure and reference data.

An advantage of the solution of the invention is that it enables the cooling of the enclosure to be monitored, which monitoring makes it possible to consider both steady-state and dynamic conditions in the enclosure.

BRIEF DESCRIPTION OF THE DRAWINGS

In the following exemplary embodiments will be described in greater detail with reference to the accompanying drawings, in which.

DETAILED DESCRIPTION

The following embodiments are exemplary. Although the description may refer to "an", "one", or "some" embodiment(s) in several locations, this does not necessarily mean that each such reference is to the same embodiment(s), or that the feature only applies to a single embodiment, for example. Single features of different embodiments may also be combined to provide other embodiments. Generally, all terms and expressions used should be interpreted broadly and they are intended to illustrate, not to restrict, the embodiments. The figures only show components necessary for understanding the various embodiments. The number and/or configuration of the various elements, and generally their implementation, could vary from the examples shown in the figures.

Different embodiments and examples may be described below using single units, models, equipment and memory, without restricting the embodiments/examples to such a solution. Concepts called cloud computing and/or virtualization may be used. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In possible cloud computing network devices, computing devices and/or storage devices may provide shared resources. Some other technology advancements, such as Software-Defined Networking (SDN), may cause one or more of the functionalities described below to be migrated to any corresponding abstraction or apparatus or device. Therefore, all words and expressions should be interpreted broadly, and they are intended to illustrate, not to restrict, the embodiment in question.

Figure 1:
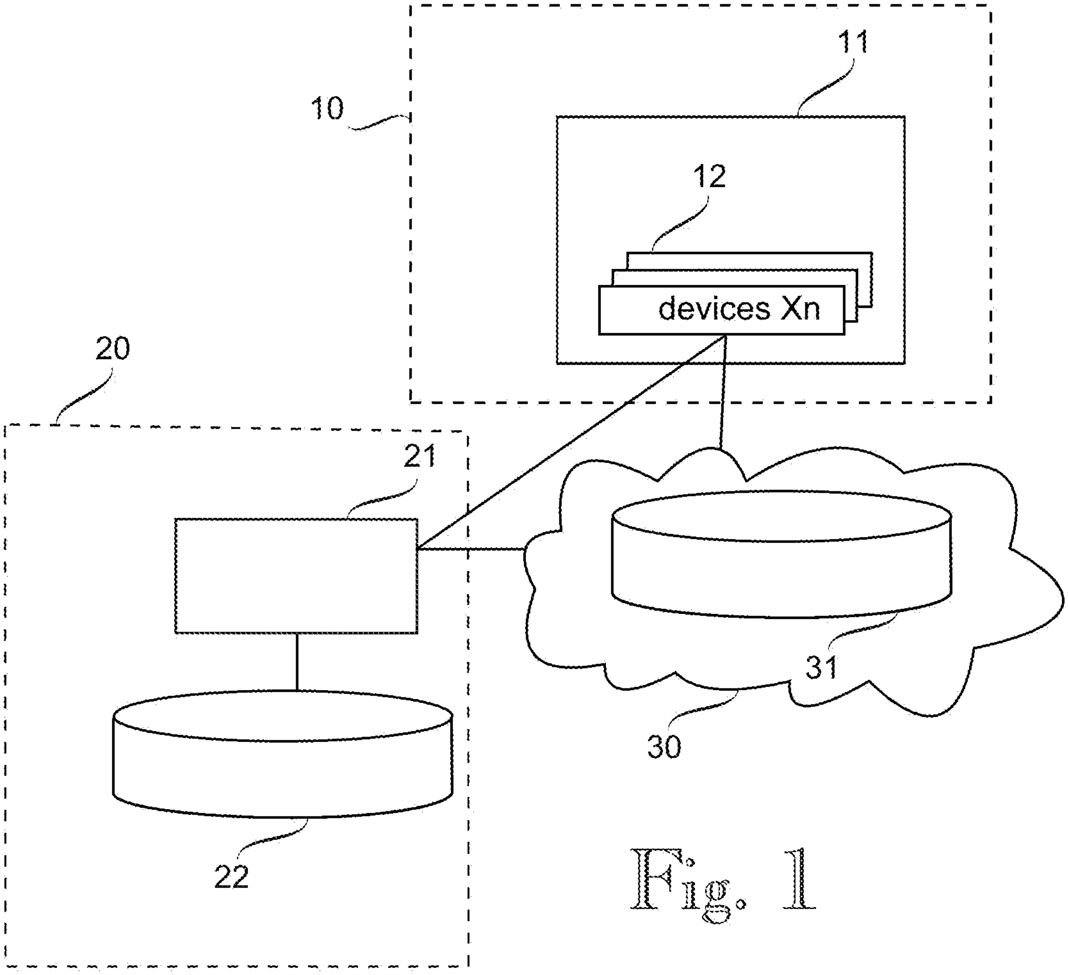
FIG. 1 illustrates a block diagram of an exemplary system.

FIG. 1 is a simplified block diagram of an exemplary system showing some equipment (e.g. apparatuses, devices, nodes) and functional entities, whose implementation and/or number and/or configuration may differ from what is shown in the example of FIG. 1. The connections shown in FIG. 1 are logical connections and corresponding actual physical connections could be different. Such a system may also comprise other equipment, functional entities and/or structures, some of which used in or for big data, data management, and communication in the system or in any part of the system, for example. Also e.g. any communications protocols used may vary and may depend on the system characteristics, for instance.

The exemplary system of FIG. 1 comprises an enclosure 11 and one or more electric devices Xn 12 located within the enclosure. The one or more electric devices 12 located within the enclosure 11 may be located at an industrial site 10 or another site, for example. A non-limiting list of examples of such industrial sites includes power plants, manufacturing plants, chemical processing plants, power transmission systems, mining and mineral processing plants, oil and gas systems, data centres, ships and other vehicles, transportation fleet systems and utility plants. The exemplary system of FIG. 1 further comprises a monitoring arrangement (e.g. apparatus, device, unit) 21 configured for monitoring the one or more electric devices 12. At least part of the functionality of the various embodiments described herein may be implemented with the exemplary monitoring arrangement 21. The monitoring arrangement 21 may be located at the same site 10 as the one or more electric devices 12 or at another site 20, such as a remote site. The monitoring arrangement 21 could also be located within one or more electric devices 12 or otherwise within or in connection with the enclosure 11. The exemplary system of FIG. 1 further comprises a data storage 22 in connection with the monitoring arrangement 21. Such a data storage 22 could be also included within the monitoring arrangement 21. The exemplary system of FIG. 1 further comprises a cloud platform 30 with a data storage 31, such as a shared database. The data storages 22, 31 may be any kind of conventional or future data repositories, including distributed and centralized storing of data, managed by any suitable management system, for example. The actual implementation of the data storages 22, 31, e.g. the manner how data is stored, retrieved and updated, and details of how the data storage is interfaced, and the location where the data is stored are irrelevant to the invention. The monitoring arrangement 21 may be configured to use at least one of the data storages 22, 31 for storing (recording) data therein and for retrieving stored (recorded) data therefrom.

The one or more electric devices 12 may be industrial devices that may be configured to collect various process data, such as temperature data, and to transfer (transmit) it to the shared database 31 within the cloud platform and/or directly to the monitoring arrangement 21, for example. It is alternatively or additionally possible that a separate measuring arrangement (not shown separately) is provided in connection with the enclosure 11 for measuring and transferring e.g. temperature data from the enclosure 11. As an example, the enclosure 11 could comprise one or more temperature sensors configured to measure temperature inside the enclosure 11 and/or outside the enclosure 11, and to transmit the temperature data to the monitoring arrangement 21 and/or the cloud platform 30.

Such an industrial device may be an industrial automation device, for example. An industrial automation device generally refers to electronic equipment that may be used for controlling one or more industrial processes. For example, industrial automation devices may control the position, speed, torque and/or direction of electric motors in conveyors, grinders, winders, pumps and/or fans or other devices. The industrial automation device may control the speed and/or torque of a motor by changing the frequency, current and/or voltage of the electrical supply to the motor, for example. Naturally, a motor itself, or a generator or another electric machine, is an example of an industrial device. A non-limiting list of examples of industrial automation devices includes electric drives and components thereof, frequency converters, AC/DC converters, DC/AC converters, DC/DC converters, electric powertrains and components thereof, programmable logic controllers, switches, motion controllers or motion drives, servo motors, soft starters, wind turbines, solar inverters, and any combinations thereof and other possible devices.

Figure 2:
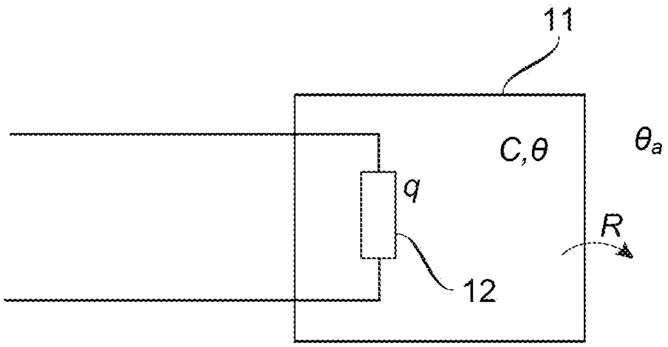
FIG. 2 illustrates an example according to an embodiment.

The enclosure 11 may be of any type and size, and may be a housing of or for one or more electric devices 12 or a room or generally any enclosed space within which the at least one electric device 12 may be located. Such an enclosure 11 may be a sealed (closed) enclosure, such as a hermetically sealed enclosure, or an unsealed enclosure, for instance. The enclosure 11 may be at least partially filled with air, and/or another gas, and/or with liquid, such as coolant liquid. FIG. 2 shows an example of an enclosure 11 with one electric 10 device 12 therein. In the simplified illustration of FIG. 2, the electric device 12 has been depicted as a resistor producing heat q inside the enclosure 11, the enclosure 11 inside temperature, e.g. air temperature, is θ and the enclosure 11 outside temperature (i.e. ambient temperature, e.g. ambient air temperature around the enclosure 11) is $\theta_a$. Moreover, the thermal resistance of the 15 enclosure 11 in the example of FIG. 2 is R and the thermal capacitance of the enclosure 11 is C.

Generally, high enclosure 11 temperature θ may be attributed to two possible reasons. The first reason is about the low rate the heat q is transferred to the outer space of the enclosure 11 by means of natural and/or forced cooling (e.g., fins, fans etc.) and/or low thermal conductivity of the enclosure 11 walls (e.g., aluminium or concrete walls). The second reason is its possibly limited capacity to store the injected heat q into its interior in the form of power losses. This may be mostly related to the enclosure 11 geometrical characteristics (e.g., volume of the air inside, air mass density) along with the heat dissipated by the equipment 12 therein, for example. Based on the above points, monitoring the enclosure cooling may be a challenging task. It may require considering both steady-state and dynamic conditions. An enclosure may be adequate for one of these conditions but fail to serve the other one. In a dynamic condition, for example, the enclosure may be heated if the rate of the injected heat in the form 30 of losses exceeds those of stored and dissipated. In a thermal equilibrium, the enclosure air may experience higher temperatures constantly. Therefore, features that consider the power cycle of the equipment may be important.

Figure 3:
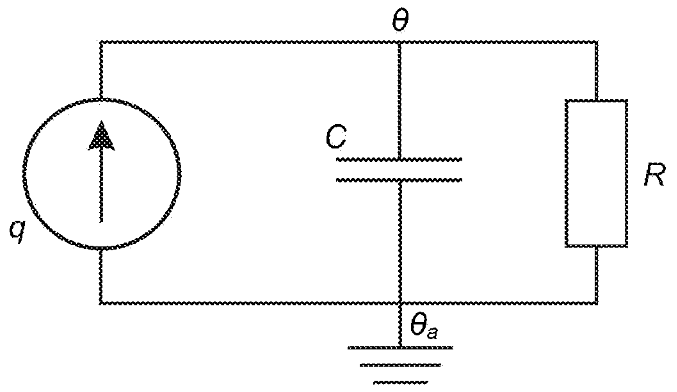
FIG. 3 illustrates an equivalent circuit according to an embodiment.

Monitoring the temperatures θ, $\theta_a$ can provide information about the operating environment; in particular when done in a systematic way while quantifying some of the effects it causes. Towards that, capturing relative temperature variations and extracting features can offer added value and assist in understanding not only the enclosure 11 cooling condition but possibly also the root cause for a problem, for instance. According to an embodiment, the temperature θ, and generally the thermal behaviour, of the enclosure 11 filling agent, e.g. air, can be estimated by means of a model, such as a first-order model. Consequently, the temperature θ of the enclosure 11 filling agent can be represented by a node in an equivalent circuit corresponding to an analogue electrical RC network as illustrated in FIG. 3, for example. There may be several masses inside the enclosure 11. The air, or other filling agent, is the mass that connects to all the other masses by the different heat transfer mechanisms (e.g., convection, conduction). Consequently, it can be assumed that the enclosure 11 air temperature contains information by all the components weighted by their contribution (e.g., heat injection, thermal conductivity), for example. Then, by knowing the R and/or C parameters may allow monitoring both static and dynamic performances, and even pointing out the possible problem (e.g. air circulation, ventilation, excess of heat losses or thermal masses). It is possible to extract the equivalent thermal resistance, R, and thermal capacitance, C, by monitoring the temperatures θ, $\theta_a$ along with the injected heat q, indicated e.g. by losses or generally any quantity in known relationship thereto. If the losses cannot be approximated, they can also be estimated e.g. by using internal temperatures, e.g., junction or winding temperatures, output or input powers with efficiency, or even neglected, where possible and depending on the system characteristics, for example.

FIG. 3 shows an equivalent circuit of a first-order thermal model of the exemplary enclosure of FIG. 2. In the following, the enclosure is considered to behave thermally as the simple first-order model as shown in FIG. 3. It is not necessary to describe the thermal behaviour of the enclosure fully, but it is sufficient to monitor the way the temperature varies throughout the system operation. According to an embodiment, the mathematical model may rely on the concept of the energy balance. The energy balance equation states that at any given location, or node, in a system, the heat into that node is equal to the heat out of the node plus any heat that is stored:

$$\text{Heat in}=\text{Heat out}+\text{Heat stored} \tag{1.1}$$

More specifically, heat q, is transferred into the enclosure 11 by the heat source, i.e. one or more electric devices 12, heat $$\frac{\theta_d}{R},$$

is dissipated through the enclosure 11 walls with the mechanism of the conduction, and heat $$C\frac{d\theta_d}{dt},$$

is stored as increased temperature in the enclosure 11 air:

$$q = \frac{\theta_d}{R} + C\frac{d\theta_d}{dt} \tag{1.2}$$

where $\theta_d$ is a temperature above the ambient temperature $\theta_a$; i.e. it represents the temperature difference between the temperature $\theta$ inside the enclosure 11 and the ambient temperature $\theta_a$ of the enclosure 11: $\theta_d=\theta-\theta_a$.

By solving eq. 1.2, it is possible to calculate the thermal resistance R, and thermal capacitance C. If e.g. cooling fins existed in the enclosure 11, then there would be one more parallel branch in the equivalent circuit of FIG. 3. However, in practice it is sufficient to approximate the effects of the air flow by using the same equivalent circuit but altering the parameter values instead, e.g., by putting those of an equivalent circuit. The same applies to cases where more masses may exist in the same enclosure. Furthermore, although the calculations may involve the use of power losses (indicating the heat in), these may not always be known. In such case, they can be estimated by using other available information. For example, the temperature difference between an internal temperature (e.g., junction for electric drives, or windings for electric machines) and enclosure temperature, or even the output power and estimated efficiency could be utilized.

The thermal resistance R may be calculated by considering the injected losses by all the one or more electric devices 12 acting as heat sources and the temperature difference $\theta_d$ between the temperature $\theta$ inside the enclosure 11 and the temperature $\theta_a$ outside the enclosure 11 under a thermal equilibrium, i.e. when $$\frac{d\theta_d}{dt} = 0,$$

as follows:

$$R = \frac{\theta_d}{q} \tag{1.3}$$

Thus, according to an embodiment, the thermal resistance R of the enclosure 11 may be determined on the basis of the received data when the rate of change of the temperature difference $$\frac{d\theta_d}{dt}$$

is essentially zero or when the rate of change of the temperature difference $$\frac{d\theta_d}{dt}$$

has been essentially zero for a first predetermined time period. And according to an embodiment, the thermal resistance R of the enclosure 11 may thus be determined on the basis of the heat q generated by the at least one electric device 12 into the enclosure 11, or a quantity indicative thereof, and the temperature difference ed between the temperature inside the enclosure 11 and the temperature outside the enclosure 11.

To calculate the thermal capacitance C, an integral of the differential equation 1.2 over a suitable period of time may be employed and transformed to its discrete form as follows:

$$\int C\frac{d\theta_d}{dt}dt = \int q dt - \int \frac{\theta_d}{R}dt \tag{1.4}$$

$$\sum \Delta\theta_{d_i} = \frac{1}{C}\sum q_i\Delta t_i - \frac{1}{CR}\sum \theta_{d_i}\Delta t_i \tag{1.5}$$

$$\text{where } \theta_{d_i} = \theta_i - \theta_{a_i}$$

Using the discrete form may facilitate the implementation in digital means and allow considering longer periods of time for minimizing calculation and approximation errors, for example. As shown in equation 1.6 below, the temperature difference is proportional to the difference between the heat in and out. Therefore, depending on each specific case, there may not be a necessity of calculating the capacitance but only monitoring the following relationship:

$$\sum \Delta\theta_{d_i} \propto \sum q_i\Delta t_i - \frac{\sum \theta_{d_i}\Delta t_i}{R} \tag{1.6}$$

The calculation of the thermal capacitance may be done by using the following equation:

$$\frac{1}{C} \approx \frac{\sum \Delta\theta_{d_i}}{\sum q_i \Delta t_i - \frac{\sum \theta_{d_i} \Delta t_i}{R}} \quad (1.7)$$

The suitable period of time used for the calculations can vary and does not need to obey certain criteria; essentially any moment in time and any duration of time may be used. Also the sample interval between samples i and the number of samples i may vary and may be selected e.g. according to a desired or required accuracy of the calculation. Thus, according to an embodiment, the thermal capacitance C of the enclosure 11 may be determined on the basis of a heat generated by the at least one electric device 12 and stored into the enclosure 11 over a second predetermined time period, e.g. corresponding to the denominator of equation 1.7, and a cumulative change of the temperature difference between the temperature inside the enclosure 11 and the temperature outside the enclosure 11 occurring over the second predetermined time period, e.g. corresponding to the numerator of equation 1.7 above. According to an embodiment, the heat generated by the at least one electric device 12 and stored into the enclosure 11 over the second predetermined time period may be determined on the basis of the heat generated by the at least one electric device 12 into the enclosure 11 over the second predetermined time period, or a quantity indicative thereof, as represented by $\Sigma q_i \Delta t_i$ in equation 1.7, and a heat dissipated from the enclosure 11 over the second predetermined time period. Moreover, the heat dissipated from the enclosure 11 over the second predetermined time period may be determined on the basis of a cumulative temperature difference between the temperature inside the enclosure 11 and the temperature outside the enclosure 11 occurring over the second predetermined time period and the determined thermal resistance of the enclosure 11, e.g. as represented by $$\frac{\sum \theta_{d_i} \Delta t_i}{R}$$

in equation 1.7.

Figure 4:
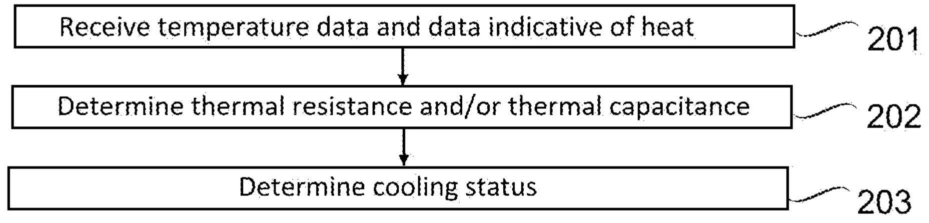
FIG. 4 illustrates a flow chart according to an embodiment.

FIG. 4 illustrates a flow chart according to an embodiment. According to an embodiment, a method for method for monitoring cooling of an enclosure 11 comprising at least one electric device 12 comprises receiving 201 temperature data on a temperature $\theta_a$ outside the enclosure 11, receiving 201 temperature data on a temperature θ inside the enclosure 11, and receiving 201 data indicative of heat q generated by the at least one electric device 12 into the enclosure 11. The data may be received 201 essentially continuously or at intervals, for example. The method further comprises determining 202 a thermal resistance of the enclosure 11 and/or a thermal capacitance of the enclosure 11 on the basis of the received data, which may be performed as explained above in connection with equations 1.1 to 1.7, for example. The method also comprises determining 203 a cooling status of the enclosure 11 on the basis of the determined thermal resistance of the enclosure 11 and thermal resistance reference data and/or on the basis of the determined thermal capacitance of the enclosure 11 and thermal capacitance reference data. Term 'cooling status' herein generally refers to a state or condition of cooling, i.e. it may indicate if the cooling of the enclosure 11 is sufficient (normal) or insufficient (abnormal), for example. The cooling status of the enclosure 11 may also indicate the state of cooling of the enclosure 11 in more detail with a scale having more than two levels and/or in case of an insufficient (abnormal) cooling also the possible cause for the abnormal situation, for instance.

According to an embodiment, the determining 203 of the cooling status of the enclosure 11 may comprise comparing the determined thermal resistance R of the enclosure 11 with the thermal resistance reference data and/or comparing the determined thermal capacitance C of the enclosure 11 with the thermal capacitance reference data. According to an embodiment, the thermal resistance reference data and/or the thermal capacitance reference data comprise historical data of the enclosure 11 or a comparable enclosure. In other words, historical data may be used as the reference data against which the determined thermal resistance R of the enclosure 11 and/or the determined thermal capacitance C of the enclosure 11 may be compared in order to identify the cooling status of the enclosure 11. Such historical data of the enclosure 11 or a comparable enclosure could be obtained by measurements performed in advance under various cooling conditions and circumstances of the enclosure 11 or a comparable enclosure, for example. In addition, or alternatively, the thermal resistance reference data and/or the thermal capacitance reference data may comprise data based on simulations or calculations corresponding to various cooling conditions and circumstances of the enclosure 11 or a corresponding enclosure, for instance. The comparison the determined thermal resistance R of the enclosure 11 with the thermal resistance reference data and/or comparing the determined thermal capacitance C of the enclosure 11 with the thermal capacitance reference data may comprise determining if the determined thermal resistance R of the enclosure 11 differs from the thermal resistance reference data more than a predetermined threshold and/or the determined thermal capacitance C of the enclosure 11 differs from the thermal capacitance reference data more than a predetermined threshold, for example. Such comparison may also comprise determining how the thermal resistance R and/or the thermal capacitance C of the enclosure 11 change over time, e.g. the direction and/or the rate of the change.

Thus, the required inputs are the temperature θ inside the enclosure 11, e.g. air temperature around the at least one electric device 12 inside the enclosure 11, the temperature $\theta_a$ outside the enclosure 11, e.g. air temperature around the enclosure 11 (e.g. adjacent to or at the outer surface of the enclosure 11), and some information about the heat injected by the at least one electric device 12 into the enclosure 11. If there are more than one electric device 12 in the enclosure 11, then preferably the total heat injected by all the electric devices 12 is observed. According to an embodiment, the data indicative of the heat q generated by the at least one electric device 12 into the enclosure 11 may comprise data on a power loss or an estimated power loss of the at least one electric device 12 and/or data on an energy loss or an estimated energy loss of the at least one electric device 12. The temperatures θ, $\theta_a$ may be readily recorded by many electric devices 12, whereas the operating conditions may be used for estimating the generated heat. For example, the losses or estimated losses, if known, or the active power or current of the at least one electric device 12 may be used for estimating the generated heat q. Generally, when the at least one electric device 12 operates, a certain amount of heat q is dissipated into the enclosure 11. The enclosure 11 temperature θ, e.g. inside-air temperature, ambient temperature Oa and the injected heat q may be monitored, and the thermal resistance of the enclosure 11 and/or the thermal capacitance of the enclosure 11 can be determined on the basis of the received data; and consequently the cooling status of the enclosure 11 may be determined.

According to an embodiment, control data may be sent to the at least one electric device 12 on the basis of the determined cooling status of the enclosure 11. As an example, if it is determined 203, that the cooling status of the enclosure 11 is abnormal or indicates a problem or a fault, the at least one electric device 12 may be controlled suitably to reduce or prevent producing heat into the enclosure 11. Additionally, or alternatively, any other measures may be taken on the basis of the result of the determining 203 of the cooling status of the enclosure 11. According to an embodiment, additionally or alternatively, the determined cooling status of the enclosure 11 may also be output, e.g. displayed, to an operator or user, or transmitted to a further system or entity.

According to an embodiment, the determining of the cooling status of the enclosure 11 may be carried out according to the following example. It should be noted that the steps in the following example could be modified, one of more steps could be omitted, and/or further steps could be added. Thus, the following example is provided merely to illustrate some possible embodiments and not to restrict the invention to all the specific features included in the example.

STEP 1: During the system operation, i.e. when at least one of the one or more electric devices 12 located within the enclosure 11 is/are operative, samples of the enclosure air temperature and ambient air temperature are recorded along with the output power (e.g. measured or estimated) of the one or more electric devices 12. The injected power or energy losses indicative of the heat q can be simply estimated by using an approximate value for the efficiency of the one or more electric devices 12. If the ambient air temperature remains essentially constant, it may be adequate to measure it only once.

STEP 2: Under a certain first predetermined period of time, e.g. about 10 min depending on the system characteristics, where the rate of change of the temperature difference $$\frac{d\theta_d}{dt}$$

is around zero, the thermal resistance R is calculated by dividing the temperature difference of the samples obtained in STEP 1 with the injected power losses.

STEP 3: During the system operation, the energies dissipated, injected, and stored are calculated for a second predetermined period of time, as follows:

STEP A: The energy dissipated to the outer space is calculated by using the temperature samples of STEP 1 and thermal resistance of STEP 2.

STEP B: The energy injected into the enclosure 11 is determined by using the estimated energy losses of STEP 1.

STEP C: The stored energy is found by subtracting the energy of STEP 3A from that of STEP 3B.

STEP 4: The thermal capacitance C is found by dividing the stored energy of STEP 3C by the cumulative change of the temperature difference for the same time period of STEP 3.

STEP 5: The estimated RC parameters are stored and processed locally or transmitted to remote means with processing capacity.

STEP 6: The stored values are compared against reference data, such as historical data of the same enclosure or other enclosures of similar size and specifications, for example.

STEP 7: If one or both parameters, R and/or C, vary by a certain threshold from the reference data, an alarm is signalled and/or operational insights about the system are stored and/or another action may be taken.

The purpose of the exemplary steps described above is not necessarily to find exact values of the equivalent thermal resistance and capacitance, but preferably to monitor the way they change. By doing so, it is possible to e.g. warn the user or operator of the system about the possible root cause or even take actions. For example, blocked cooling fins in the enclosure can increase the thermal resistance, adding more masses to the enclosure will increase the capacitance thereof. Also, it is possible to determine if the enclosure is appropriate for a specific power cycling, for instance.

According to an embodiment, any type and number of electric devices as heat sources or even thermal masses may be monitored because the superposition principle holds for heat transfer problems, for instance. According to an embodiment, an execution of the exemplary routine may be essentially continuous and/or it can be triggered based on e.g. monitoring needs, such as criticality of an application, variation of the parameters, etc., and/or any other trigger possibly depending on the characteristics of the system in question. According to an embodiment, while a precise estimation of the injected losses, and consequently the heat q, may bring additional value and may thus be preferable, any other suitable parameters may be employed for that purpose either alternatively or in addition, such as temperature difference between an internal point and the enclosure air. Any term or quantity that remains proportional to the injected losses, and consequently the heat q, may also be used. Moreover, while some heat sources in the enclosure may be unknown, they may be ignored in the calculations, if they are not of significant value or they do not vary considerably, for example.

The monitoring arrangement 21 or other means for implementing at least part of the functionality according to any one of the embodiments herein, or a combination thereof, may be implemented as one physical unit or as two or more separate physical units that are configured to implement the functionality. Herein the term 'unit' generally refers to a physical or logical entity, such as a physical device or a part thereof or a software routine. The monitoring arrangement 21 or other means for implementing at least part of the functionality according to any one of the embodiments herein may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the various embodiments, or a part thereof, may further comprise suitable input means for receiving e.g. measurement and/or control data, and output means for outputting e.g. control or any other data, such as the determined thermal load. It is also possible to use a specific integrated circuit or circuits, such as application-specific integrated circuits (ASIC), digital signal processing devices (DSPD), programmable logic devices (PLD), field-programmable gate arrays (FPGA) and/or discrete electric components and devices for implementing the functionality according to any one of the embodiments.

Many electric devices, such as electric power systems, and components thereof may comprise processors and memory that may be utilized in implementing the functionality according to the various embodiments described herein. Thus, at least some modifications and configurations possibly required for implementing an embodiment could be performed as software routines, which may be implemented as added or updated software routines. If at least part of the functionality of any of the embodiments is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing any of the embodiments may be loaded to the unit or units executing the computer program code via a suitable data network, for example, and it may replace or update a possibly existing program code. An embodiment may provide a computer program embodied on any client-readable distribution/data storage medium or memory unit(s) or article(s) of manufacture, comprising program instructions executable by one or more processors/computers, which instructions, when loaded into an apparatus, constitute the monitoring arrangement, or any corresponding unit or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the possible units/sub-units and/or algorithms for one or more functions/operations described above, for example by means of any of FIGS. 1 to 3 and any combination thereof, may be an element that comprises one or more arithmetic logic units, a number of special registers and control circuits.

It will be obvious to a person skilled in the art that, as the technology advances, the inventive concept can be implemented in various ways. The invention and its embodiments are not limited to the examples described above but may vary within the scope of the claims.

What is claimed is:

1. A computer implemented method for monitoring and controlling cooling of an enclosure comprising at least one industrial automation device configured for controlling one or more industrial processes, the method including:

receiving, during an operation of the at least one industrial automation device, temperature data on a temperature outside the enclosure;

receiving, during the operation of the at least one industrial automation device, temperature data on a temperature inside the enclosure;

receiving, during the operation of the at least one industrial automation device, data indicative of heat generated by the at least one industrial automation device into the enclosure;

determining, during the operation of the at least one industrial automation device, a thermal resistance of the enclosure and/or a thermal capacitance of the enclosure on the basis of the received data comprising the temperature data on the temperature outside the enclosure, the temperature data on the temperature inside the enclosure and the data indicative of the heat generated by the at least one industrial automation device into the enclosure;

determining, during the operation of the at least one industrial automation device, a cooling status of the enclosure on the basis of the determined thermal resistance of the enclosure and thermal resistance reference data and/or on the basis of the determined thermal capacitance of the enclosure and thermal capacitance reference data; and controlling, during the operation of the at least one industrial automation device, the at least one industrial automation device on the basis of the determined cooling status of the enclosure, the controlling comprising controlling the at least one industrial automation device to reduce or prevent producing heat into the enclosure in response to the determined cooling status of the enclosure being abnormal or indicating a problem or a fault.

2. The computer implemented method of claim 1, wherein the data indicative of the heat generated by the at least one industrial automation device into the enclosure comprises data on a power loss or an estimated power loss of the at least one industrial automation device and/or data on an energy loss or an estimated energy loss of the at least one industrial automation device.

3. The computer implemented method of claim 1, wherein the thermal resistance of the enclosure is determined on the basis of the received data when a rate of change of a temperature difference between the temperature inside the enclosure and the temperature outside the enclosure is essentially zero or has been essentially zero for a first predetermined time period.

4. The computer implemented method of claim 3, wherein the thermal resistance of the enclosure is determined on the basis of the heat generated by the at least one industrial automation device into the enclosure, or a quantity indicative thereof, and the temperature difference between the temperature inside the enclosure and the temperature outside the enclosure.

5. The computer implemented method of claim 1, wherein the thermal capacitance of the enclosure is determined on the basis of a heat generated by the at least one industrial automation device and stored into the enclosure over a second predetermined time period, and a cumulative change of the temperature difference between the temperature inside the enclosure and the temperature outside the enclosure occurring over the second predetermined time period, wherein the heat generated by the at least one industrial automation device and stored into the enclosure over the second predetermined time period is determined on the basis of the heat generated by the at least one industrial automation device into the enclosure over the second predetermined time period, or a quantity indicative thereof, and a heat dissipated from the enclosure over the second predetermined time period, and wherein the heat dissipated from the enclosure over the second predetermined time period is determined on the basis of a cumulative temperature difference between the temperature inside the enclosure and the temperature outside the enclosure occurring over the second predetermined time period and the determined thermal resistance of the enclosure.

6. The computer implemented method of claim 1, wherein the determining of the cooling status of the enclosure includes comparing the determined thermal resistance of the enclosure with the thermal resistance reference data and/or comparing the determined thermal capacitance of the enclosure with the thermal capacitance reference data.

7. The computer implemented method of claim 6, wherein the thermal resistance reference data and/or the thermal capacitance reference data includes historical data of the enclosure or a comparable enclosure.

8. A computer program product comprising:

a non-transitory computer readable medium; and program instructions embodied on the non-transitory computer readable medium, wherein execution of the program instructions in a computing apparatus configured to control at least one industrial automation device configured for controlling one or more industrial processes causes the computing apparatus to:

receive, during an operation of the at least one industrial automation device, temperature data on a temperature outside an enclosure comprising the at least one industrial automation device;

receive, during the operation of the at least one industrial automation device, temperature data on a temperature inside the enclosure;

receive, during the operation of the at least one industrial automation device, data indicative of heat generated by the at least one industrial automation device into the enclosure;

determine, during the operation of the at least one industrial automation device, a thermal resistance of the enclosure and/or a thermal capacitance of the enclosure on the basis of the received data comprising the temperature data on the temperature outside the enclosure, the temperature data on the temperature inside the enclosure and the data indicative of the heat generated by the at least one industrial automation device into the enclosure;

determine, during the operation of the at least one industrial automation device, a cooling status of the enclosure on the basis of the determined thermal resistance of the enclosure and thermal resistance reference data and/or on the basis of the determined thermal capacitance of the enclosure and thermal capacitance reference data; and control, during the operation of the at least one industrial automation device, the at least one industrial automation device on the basis of the determined cooling status of the enclosure, the control comprising controlling the at least one industrial automation device to reduce or prevent producing heat into the enclosure in response to the determined cooling status of the enclosure being abnormal or indicating a problem or a fault.

9. An apparatus for monitoring and controlling cooling of an enclosure having at least one industrial automation device configured for controlling one or more industrial processes, the apparatus comprising:

a processor, and a memory storing instructions that, when executed by the processor, cause the apparatus to:

receive, during an operation of the at least one industrial automation device, temperature data on a temperature outside the enclosure;

receive, during the operation of the at least one industrial automation device, temperature data on a temperature inside the enclosure;

receive, during the operation of the at least one industrial automation device, data indicative of heat generated by the at least one industrial automation device into the enclosure;

determine, during the operation of the at least one industrial automation device, a thermal resistance of the enclosure and/or a thermal capacitance of the enclosure on the basis of the received data comprising the temperature data on the temperature outside the enclosure, the temperature data on the temperature inside the enclosure and the data indicative of the heat generated by the at least one industrial automation device into the enclosure;

determine, during the operation of the at least one industrial automation device, a cooling status of the enclosure on the basis of the determined thermal resistance of the enclosure and thermal resistance reference data and/or on the basis of the determined thermal capacitance of the enclosure and thermal capacitance reference data; and control, during the operation of the at least one industrial automation device, the at least one industrial automation device on the basis of the determined cooling status of the enclosure, the control comprising controlling the at least one industrial automation device to reduce or prevent producing heat into the enclosure in response to the determined cooling status of the enclosure being abnormal or indicating a problem or a fault.

10. The apparatus of claim 9, wherein the data indicative of the heat generated by the at least one industrial automation device into the enclosure comprises data on a power loss or an estimated power loss of the at least one industrial automation device and/or data on an energy loss or an estimated energy loss of the at least one industrial automation device.

11. The apparatus of claim 9, wherein the thermal resistance of the enclosure is determined on the basis of the received data when a rate of change of a temperature difference between the temperature inside the enclosure and the temperature outside the enclosure is essentially zero or has been essentially zero for a first predetermined time period.

12. The apparatus of claim 11, wherein the thermal resistance of the enclosure is determined on the basis of the heat generated by the at least one industrial automation device into the enclosure, or a quantity indicative thereof, and the temperature difference between the temperature inside the enclosure and the temperature outside the enclosure.

13. The apparatus of claim 9, wherein the thermal capacitance of the enclosure is determined on the basis of a heat generated by the at least one industrial automation device and stored into the enclosure over a second predetermined time period, and a cumulative change of the temperature difference between the temperature inside the enclosure and the temperature outside the enclosure occurring over the second predetermined time period, wherein the heat generated by the at least one industrial automation device and stored into the enclosure over the second predetermined time period is determined on the basis of the heat generated by the at least one industrial automation device into the enclosure over the second predetermined time period, or a quantity indicative thereof, and a heat dissipated from the enclosure over the second predetermined time period, and wherein the heat dissipated from the enclosure over the second predetermined time period is determined on the basis of a cumulative temperature difference between the temperature inside the enclosure and the temperature outside the enclosure occurring over the second predetermined time period and the determined thermal resistance of the enclosure.

14. The apparatus of claim 9, wherein the determining of the cooling status of the enclosure includes comparing the determined thermal resistance of the enclosure with the thermal resistance reference data and/or comparing the determined thermal capacitance of the enclosure with the thermal capacitance reference data.

15. The apparatus of claim 14, wherein the thermal resistance reference data and/or the thermal capacitance reference data comprise historical data of the enclosure or a comparable enclosure.

16. A system comprising:

an enclosure;

at least one industrial automation device configured for controlling one or more industrial processes and located within the enclosure; and at least one apparatus configured to:

receive, during an operation of the at least one industrial automation device, temperature data on a temperature outside the enclosure;

receive, during the operation of the at least one industrial automation device, temperature data on a temperature inside the enclosure;

receive, during the operation of the at least one industrial automation device, data indicative of heat generated by the at least one industrial automation device into the enclosure;

determine, during the operation of the at least one industrial automation device, a thermal resistance of the enclosure and/or a thermal capacitance of the enclosure on the basis of the received data comprising the temperature data on the temperature outside the enclosure, the temperature data on the temperature inside the enclosure and the data indicative of the heat generated by the at least one industrial automation device into the enclosure;

determine, during the operation of the at least one industrial automation device, a cooling status of the enclosure on the basis of the determined thermal resistance of the enclosure and thermal resistance reference data and/or on the basis of the determined thermal capacitance of the enclosure and thermal capacitance reference data; and control, during the operation of the at least one industrial automation device, the at least one industrial automation device on the basis of the determined cooling status of the enclosure, the controlling comprising at least one of derating or shutting down the at least one industrial automation device in response to the determined thermal resistance deviating from the thermal resistance reference data by more than a predetermined threshold and/or the determined thermal capacitance deviating from the thermal capacitance reference data by more than a predetermined threshold.

17. The system of claim 16, further comprising one or more temperature sensors configured to measure temperature inside the enclosure and to send the temperature data to the at least one apparatus.

18. The system of claim 16, wherein the at least one industrial automation device is configured to send to the at least one apparatus temperature data on the temperature inside the enclosure and/or data indicative of heat generated by the at least one industrial automation device.

19. The system of claim 16, wherein the at least one industrial automation device comprises at least one industrial automation drive.

* * * * *